United States Patent [19]

Kaufmann

[11] 4,422,152

[45] Dec. 20, 1983

[54] AUTOMATIC FIXED-QUANTITY/VARIABLE-TIME ANTI-OXIDATION REPLENISHER CONTROL SYSTEM

[75] Inventor: Kenneth M. Kaufmann, Minneapolis, Minn.

[73] Assignee: Pako Corporation, Minneapolis, Minn.

[21] Appl. No.: 323,073

[22] Filed: Nov. 19, 1981

[51] Int. Cl.³ ........................ G06F 15/46; G03D 3/06

[52] U.S. Cl. .................................... 364/502; 354/298; 137/93

[58] Field of Search ................ 354/297, 298; 364/502; 137/93

[56] References Cited

U.S. PATENT DOCUMENTS

| | | | |
|---|---|---|---|
| 3,472,143 | 10/1969 | Hixon et al. | 95/89 |
| 3,529,529 | 9/1970 | Schumacher | 95/89 |
| 3,554,109 | 1/1971 | Street | 95/89 |
| 3,559,555 | 2/1971 | Street | 95/89 |
| 3,561,344 | 2/1971 | Frutiger | 95/89 |
| 3,696,728 | 10/1972 | Hope | 95/89 |
| 3,752,052 | 8/1973 | Hope et al. | 95/89 |
| 3,787,689 | 1/1974 | Fidelman | 250/219 |
| 3,822,723 | 7/1974 | Crowell et al. | 137/624.15 |
| 3,927,417 | 11/1975 | Kinoshita et al. | 354/298 |
| 3,990,088 | 11/1976 | Takita | 354/298 |
| 4,057,818 | 11/1977 | Gaskell et al. | 354/298 |
| 4,104,670 | 8/1978 | Charnley et al. | 354/324 |
| 4,119,952 | 10/1978 | Takahashi et al. | 340/309 |
| 4,128,325 | 12/1978 | Melander et al. | 354/298 |
| 4,134,663 | 1/1979 | Laar et al. | 354/298 |
| 4,174,169 | 11/1979 | Melander et al. | 354/324 |

OTHER PUBLICATIONS

Luth, *Elektronic-Film-Processor 1200/48* "E.
Luth, *Elektronic-Film-Processor LT600/24* "E.

*Primary Examiner*—Jerry Smith
*Assistant Examiner*—Allen MacDonald
*Attorney, Agent, or Firm*—Kinney, Lange, Braddock, Westman and Fairbairn

[57] ABSTRACT

A processor of photosensitive material includes an automatic control system for providing anti-oxidation replenishment, as a function of a stored anti-oxidation replenishment rate and anti-oxidation replenishment provided by exhaustion replenishment. A time interval is initiated during which the anti-oxidation replenishment required due to expired time is compared to the amount of anti-oxidation replenishment provided by the exhaustion replenishment in that time interval. When the difference by which the amount of needed anti-oxidation replenishment exceeds the anti-oxidation replenishment provided by exhaustion replenishment reaches a preset value, a fixed amount of replenisher is added to the developer tank.

7 Claims, 3 Drawing Figures

AUTOMATIC FIXED-QUANTITY/VARIABLE-TIME ANTI-OXIDATION REPLENISHER CONTROL SYSTEM

CROSS REFERENCE TO PATENTS AND COPENDING APPLICATIONS

Reference is hereby made to my patents entitled AUTOMATIC REPLENISHER CONTROL SYSTEM, U.S. Pat. No. 4,293,211, issued Oct. 6, 1981; AUTOMATIC ANTI-OXIDATION REPLENISHER CONTROL, U.S. Pat. No. 4,295,792, issued Oct. 20, 1981; and the following copending applications filed on an even date with the present application: AUTOMATIC FIXED-QUANTITY/FIXED-TIME ANTI-OXIDATION REPLENISHER CONTROL SYSTEM, Ser. No. 06/321619; AUTOMATIC VARIABLE-QUANTITY/FIXED-TIME ANTI-OXIDATION REPLENISHER CONTROL SYSTEM, now U.S. Pat. No. 4,372,665; and AUTOMATIC VARIABLE-QUANTITY/VARIABLE-TIME ANTI-OXIDATION REPLENISHER CONTROL SYSTEM, now U.S. Pat. No. 4,372,666. All of these applications are assigned to Pako Corporation, the assignee of the present application.

BACKGROUND OF THE INVENTION

1. Field of the Invention

The present invention relates to an automatic anti-oxidation replenisher control system for use in processors of photosensitive material.

2. Description of the Prior Art

Automatic photographic film and paper processors transport sheets or webs of photographic film or paper through a sequence of processor tanks in which the photosensitive material is developed, fixed, and washed, and then transport the material through a dryer. It is well known that photographic processors require replenishment of the processing fluids to compensate for changes in the chemical activity of the fluids.

First, it has been recognized that replenishment is necessary to replace constituents used as photosensitive film or paper is developed in the processor. This replenishment is "use related" or "exhaustion" chemical replenishment. Both developer and fix solutions require exhaustion replenishment.

Second, chemical activity of the developer solution due to aerial oxidation occurs with the passage of time regardless of whether film or paper is being processed. Replenishment systems provide additional replenishment of an "anti-oxidation" (A-O) replenishment solution which counteracts this deterioration.

Replenishment systems were originally manually operated. The operator would visually inspect the processed film or paper and manually operate a replenishment system as he deemed necessary. The accuracy of the manual replenishment systems was obviously dependent upon the skill and experience of the operator.

Various automatic replenishment systems have been developed for providing use-related replenishment. Examples of these automatic replenishment systems include U.S. Pat. Nos. 3,472,143 by Hixon et al; 3,529,529 by Schumacher; 3,554,109 by Street et al; 3,559,555 by Street; 3,561,344 by Frutiger et al; 3,696,728 by Hope; 3,752,052 by Hope et al; 3,787,689 by Fidelman; 3,927,417 by Kinoshita et al; 3,990,088 by Takita; 4,057,818 by Gaskell et al; 4,104,670 by Charnley et al; 4,119,952 by Takahashi et al; 4,128,325 by Melander et al; and 4,134,663 by Laar et al.

Examples of prior art replenisher controls for providing both exhaustion and anti-oxidation replenishment are shown in U.S. Pat. Nos. Re. 30,123 by Crowell et al and 4,174,169 by Melander et al. In particular, these patents show systems which are usable to control anti-oxidation replenishment when a type of anti-oxidation replenishment known as "blender chemistry" is used. Blender chemistry is based upon a "minimum daily requirement" of anti-oxidation replenishment. This minimum daily requirement is dependent upon the amount of aerial oxidation which occurs in the developer tank, which in turn is dependent upon the open surface area of the tank, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

Crowell discloses a variable quantity, fixed time anti-oxidation replenishment control in which a variable amount of anti-oxidation replenishment needed due to aging is determined at fixed time intervals based upon the replenishment provided by use or exhaustion replenishment during the time interval. At fixed time intervals, a needed amount of anti-oxidation replenishment is added, which varies from zero up to a predetermined maximum amount. The more exhaustion replenishment provided during the time interval, the less anti-oxidation replenishment is required. The apparatus in Crowell does not consider, however, the situation where more anti-oxidation replenishment than is needed is provided by the exhaustion replenishment. Thus overage can lead to an accumulated error in the Crowell system. Overreplenishment of anti-oxidation fluid will produce incorrect processing results, just as will underreplenishment. There is no recognition in Crowell that this error accumulation can occur, or of any way to resolve it. In addition, the system of Crowell et al is limited by its use of analog electronics and electromechanical cams, which make the system difficult to calibrate and limit the number of control options available to the user.

Melander et al discloses a fixed quantity, variable time anti-oxidation system based on a counter which is set to a predetermined value and then counted down over time to measure oxidation of processor fluid. When the counter reaches zero, a fixed amount of anti-oxidation replenisher is added. The counter is counted up to reflect anti-oxidation replenishment provided as a result of exhaustion replenishment.

SUMMARY OF THE INVENTION

The automatic control system of the present invention is a fixed quantity, variable time anti-oxidation replenishment control system which adds a fixed amount of anti-oxidation replenishment fluid to the developer tank at variable time intervals which vary as a function of exhaustion replenishment provided. The time at which this fixed amount is added is determined by initiating a variable time interval, which is measured by a clock means. The amount of anti-oxidation replenishment provided as a result of the exhaustion replenishment is used to provide a first replenishment signal. A stored anti-oxidation replenishment rate and the measured time are used to provide a second replenishment signal indicative of how much anti-oxidation replenishment is needed. The two signals are compared periodically. If the difference between the two signals is equal to or greater than a preset value, the fixed amount of anti-oxidation replenishment is supplied to the developer tank. Another variable time interval is then started. In another embodiment the periodic checking is delayed until the minimum time, for which the fixed amount of replenisher is adequate, expires. This minimum time assumes that no exhaustion replenishment occurs.

DETAILED DESCRIPTION OF THE PREFERRED EMBODIMENTS

Figure 1:
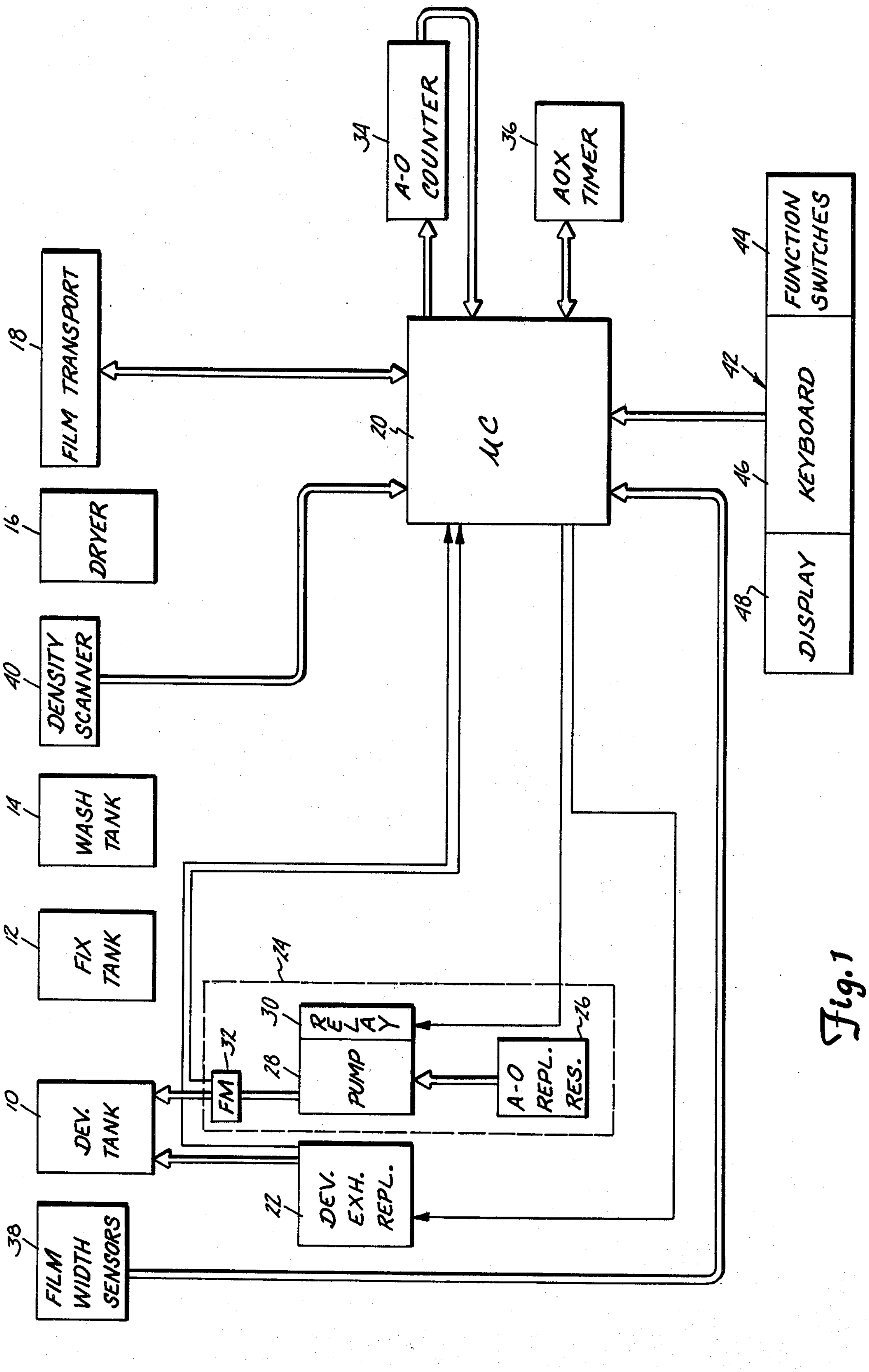
FIG. 1 is a block diagram illustrating a processor including a preferred embodiment of the automatic anti-oxidation replenishment control system of the present invention which uses a pump to deliver a fixed amount of anti-oxidation replenishment fluid.

In the system shown in FIG. 1, a photographic processor includes developer tank 10, fix tank 12, wash tank 14, and dryer 16. Film transport drive 18 transports a strip or web of photosensitive material (either film or paper) through tanks 10, 12, 14 and dryer 16. Microcomputer 20 controls operation of film transport 18 and of the automatic replenishment of fluids to tanks 10, 12 and 14.

The automatic replenishment system shown in FIG. 1 includes developer exhaustion replenisher 22 and anti-oxidation replenisher 24 for providing exhaustion and anti-oxidation replenishment, respectively, to developer tank 10. Microcomputer 20 controls operation of developer exhaustion replenisher 22 and receives a feedback signal indicating operation of developer replenisher 22. Although, in a typical processor, fix and wash replenishment also are provided, these functions are not a part of the present invention, and therefore are not shown or discussed herein.

Anti-oxidation replenisher 24 includes anti-oxidation (A-O) replenisher reservoir 26, pump 28, pump relay 30, and flow meter or switch 32. Anti-oxidation replenishment is supplied from A-O replenisher reservoir 26 to developer tank 10 by pump 28, which is controlled by microcomputer 20 by means of relay 30. Flow meter or switch 32 monitors flow of A-O replenishment to developer tank 10 and provides a feedback signal to microcomputer 20.

Microcomputer 20 utilizes A-O counter 34 as a timer to control anti-oxidation replenishment. When anti-oxidation replenishment is required, microcomputer 20 loads a numerical value (AOXTIME) into A-O counter 34, which then begins counting. Microcomputer 20 energizes relay 30, which activates pump 28. When developer counter 34 reaches a predetermined value (such as zero), it provides an interrupt signal to microcomputer 20, which deenergizes relay 30. The numerical value (AOXTIME), therefore, determines the total amount of anti-oxidation replenisher pumped into tank 10.

AOX timer 36 is a free running resettable timer which initiates and records a variable time interval. As described later, this time interval is used by microcomputer 20 in the control of anti-oxidation replenishment.

Microcomputer 20 receives signals from film width sensors 38 and density scanner 40. Film width sensors 38 are positioned at the input throat of the processor, and provide signals indicating the width of the strip of photosensitive material as it is fed into the processor. Since microcomputer 20 also controls film transport 18, and receives feedback signals from film transport 18, the width signals from film width sensors 38 and the feedback signals from film transport 18 provide an indication of the area of photosensitive material being processed.

Density scanner 40 senses density of the processed photosensitive material. The signals from density scanner 40 provide an indication of the integrated density of the processed photosensitive material. The integrated density, together with the area of material processed, provides an indication of the amount of processor fluids used or exhausted in processing that material.

Microcomputer 20 also receives signals from control panel 42, which includes function switches 44, keyboard 46, and display 48. Function switches 44 select certain functions and operating modes of the processor. Keyboard 46 permits the operator to enter numerical information, and other control signals used by microcomputer 20 in controlling operation of the processor, including the replenishment function. Display 48 displays messages or numerical values in response to control signals from microcomputer 20.

Microcomputer 20 preferably stores set values for each of a plurality of photosensitive materials that may be processed in the processor. Each group of set values includes a pump rate for pump 28 (AOXPMPRTE), and the desired replenishment rate of anti-oxidation replenishment (AOXRT).

When operation is commenced, the operator selects (through control panel 42) one of the groups of set values which corresponds to the particular photosensitive material being processed. As the leading edge of each strip of photosensitive material is fed into the processor, film width sensors 38 sense the presence of the strip, and provide a signal indicative of the width of the strip being fed into the processor. Width sensors 38 continue to provide the signal indicative of the width of the strip until the trailing edge of the strip passes sensors 38. The length of time between the leading and trailing edges of the material passing sensors 38, and the transport speed of the material (which is controlled by microcomputer 20 through film transport 18) provide an indication of the length of the strip. The width and length information for each strip is stored until the strip has been transported through the processor and reaches density scanner 40. The area of the strip and the integrated density of the strip (which is provided by the signals from density scanner 40), provide an indication of the amount of developer which has been exhausted in processing that particular strip.

As discussed previously, the present invention relates to the type of an anti-oxidation replenishment known as "blender chemistry". Blender chemistry is based upon a "minimum daily requirement" of anti-oxidation replenishment. This minimum daily requirement is dependent upon the amount of aerial oxidation which occurs in developer tank 10, which in turn is dependent upon the open surface area of tank 10, the operating temperature of the developer solution, and a number of other factors. With blender chemistry, some anti-oxidation replenishment is provided each time that exhaustion replenishment occurs. The more exhaustion replenishment provided, the less separate anti-oxidation replenishment is required.

A first preferred embodiment of the anti-oxidation replenishment control system of the present invention, as shown in FIG. 1, uses pump 28 to transfer a predetermined fixed amount of anti-oxidation replenisher from anti-oxidation replenisher reservoir 26 to developer tank 10. A-O counter 34 is used to measure the amount of time that pump 28 will run, so that the correct amount is transferred to developer tank 10. When microcomputer 20 activates relay 30 to start pump 28, A-O counter 34 begins timing. When a fixed amount of anti-oxidation has been transmitted, pump 28 is stopped. Flow meter or switch 32 provides to microcomputer 20 a feedback signal indicating that anti-oxidation replenisher has been provided to developer tank 10.

The supplying of anti-oxidation replenisher to the processor using the system of the present invention is generally as follows. AOX timer 36, under the control of microcomputer 20, initiates a variable time interval whose length is determined by microcomputer 20. During this time interval, exhaustion replenishment is provided, as needed, by exhaustion replenisher 22 under the control of microcomputer 20. This is done, as discussed above, as a function of the use of the developer fluid in tank 10. The use is indicated by the signals from film width sensors 38, density scanner 40 and film transport 18. Microcomputer 20 determines and stores the accumulated amount of anti-oxidation (AOXDEV) replenishment supplied as a result of that exhaustion replenishment during the time interval. Microcomputer 20 periodically uses a stored anti-oxidation replenishment rate (AOXRT) and the time expired in the time interval (AOXTM), as measured by AOX timer 36, to determine periodically a second signal (AOXRT×AOXTM) which indicates the amount of anti-oxidation replenishment required in the current time interval. Microcomputer 20 then compares the first signal (AOXDEV) indicating the accumulated amount of anti-oxidation replenishment supplied in the interval as a result of the exhaustion replenishment with the second signal (AOXRT×AOXTM) indicating anti-oxidation replenishment required at the current time in the interval. A value (AOXREPL) is stored in microcomputer 20 and represents the fixed amount of anti-oxidation replenisher to be supplied to developer tank 10. This stored or preset value (AOXREPL) is typically entered by the operator, into microcomputer 20 by means of keyboard 46. If the first signal is greater than the second signal, no anti-oxidation replenishment is required and the microcomputer 20 goes on with its normal operating steps. If the second signal is greater than the first signal and the difference between the two signals exceeds the preset value (AOXREPL), microcomputer 20 activates anti-oxidation replenisher 24 to provide a fixed amount of anti-oxidation replenisher (AOXREPL) to developer tank 10.

In another embodiment, microcomputer 20 delays the periodic comparisons discussed above until the fixed quantity (AOXREPL) of anti-oxidation replenisher would be required if no exhaustion replenishment occurred. When the preset value (AOXREPL) is selected by the operator through keyboard 46, microcomputer 20 divides AOXREPL by AOXRT, the rate at which anti-oxidation replenishment is required as a function of time. The resulting value indicates the minimum time for which AOXREPL will be adequate. Therefore, no periodic comparisons are needed until the minimum time expires.

Table 1 illustrates how microcomputer 20 determines and controls anti-oxidation replenishment in accordance with the embodiment of the present invention illustrated in FIG. 1, which uses pump 28 to transfer anti-oxidation replenisher fluid. In Table 1, AOXREPL is the fixed quantity of anti-oxidation replenishment fluid. AOXTM is the time since the last anti-oxidation replenishment. This time is continually counted up on a clock means (AOX timer 36) in seconds. AOXRT is equal to the amount of anti-oxidation replenisher fluid needed per second of elapsed time. This is equivalent to the minimum daily requirement of anti-oxidation replenishment fluid divided by 86,400. AOXDEV is the anti-oxidation replenishment provided by exhaustion replenishment. AOXCARRY is anti-oxidation replenishment required, but not supplied in the current iteration. In preferred embodiments of the present invention, it is unlikely that AOXCARRY will be significant because the iterations are frequent enough to prevent AOXNED from exceeding AOXREPL by an appreciable amount. The amount by which the anti-oxidation replenishment needed (AOXNED) exceeds replenishment provided (AOXREPL) is saved for adding to AOXNED in the next iteration. For each pass through the operating steps of microcomputer 20 in a normal operating mode, microcomputer 20 performs the process listed in Table 1:

TABLE 1

1.1 AOXNED = (AOXRT × AOXTM) − AOXDEV + AOXCARRY
1.2 If AOXNED is less than AOXREPL
  (a) Reset AOXCARRY
  (b) Exit
  Else
  (a) AOXCARRY = AOXNED − AOXREPL
  (b) reset AOXDEV
  (c) Reset AOXTM
1.3 AOXTIME = (AOXREPL/AOXPMPRTE) + AOXMINRUN
1.4 If AOXTIME less than 7.5 seconds then
  (a) Calculate AOXMINRUN = AOXMINRUN + AOXTIME
  (b) Return to 1.1
1.5 Output AOXTIME to counter 34
1.6 Trigger pulse sent to counter 34 and
  (a) Replenish flag (AOX) set
1.7 Counter 34 begins decrementing and
  (a) Anti-ox replenishment pump 28 runs
  (b) When counter 34 times out, go to 1.10
1.8 If flow switch 32 does not activate and/or Anti-ox replenishment pump relay 30 does not energize then ERROR
1.9 If pump enable is turned off while counter 34 is running then
  (a) Wait 5 seconds
  (b) If change then resume 1.8
  Else
    (1) Read value remaining in counter 34 to AOXREM
    (2) Clear counter 34
    (3) Replenish flag (AOX) reset
    (4) Return to 1.1
1.10 Counter 34 times out and
  (a) Interrupt request generated
1.11 If interrupt request not acknowledged then wait;
  Else
1.12 If flow switch 32 remains activated and/or pump relay 30 remains energized then ERROR;
  Else
1.13 Reset replenish (AOX) flag and AOX Not Complete TABLE 1-continued

| |
|---|
| flag and clear AOXMINRUN |

The embodiment shown in FIG. 1, in which anti-oxidation replenishment is pumped from reservoir 26, is preferred in processors where anti-oxidation reservoir 26 must be located below developer tank 10 (which prevents the use of gravity feed). In graphic arts processors, for example, reservoirs are typically kept below the tanks. In this environment, only a pump system can be used. The delivery of a fixed quantity of anti-oxidation replenishment is advantageous, since pump 28 is not required to have high accuracy over a wide range of varying volumes to be delivered. Instead, a fixed volume is delivered by pump 28 each time replenishment is required.

Figure 2:
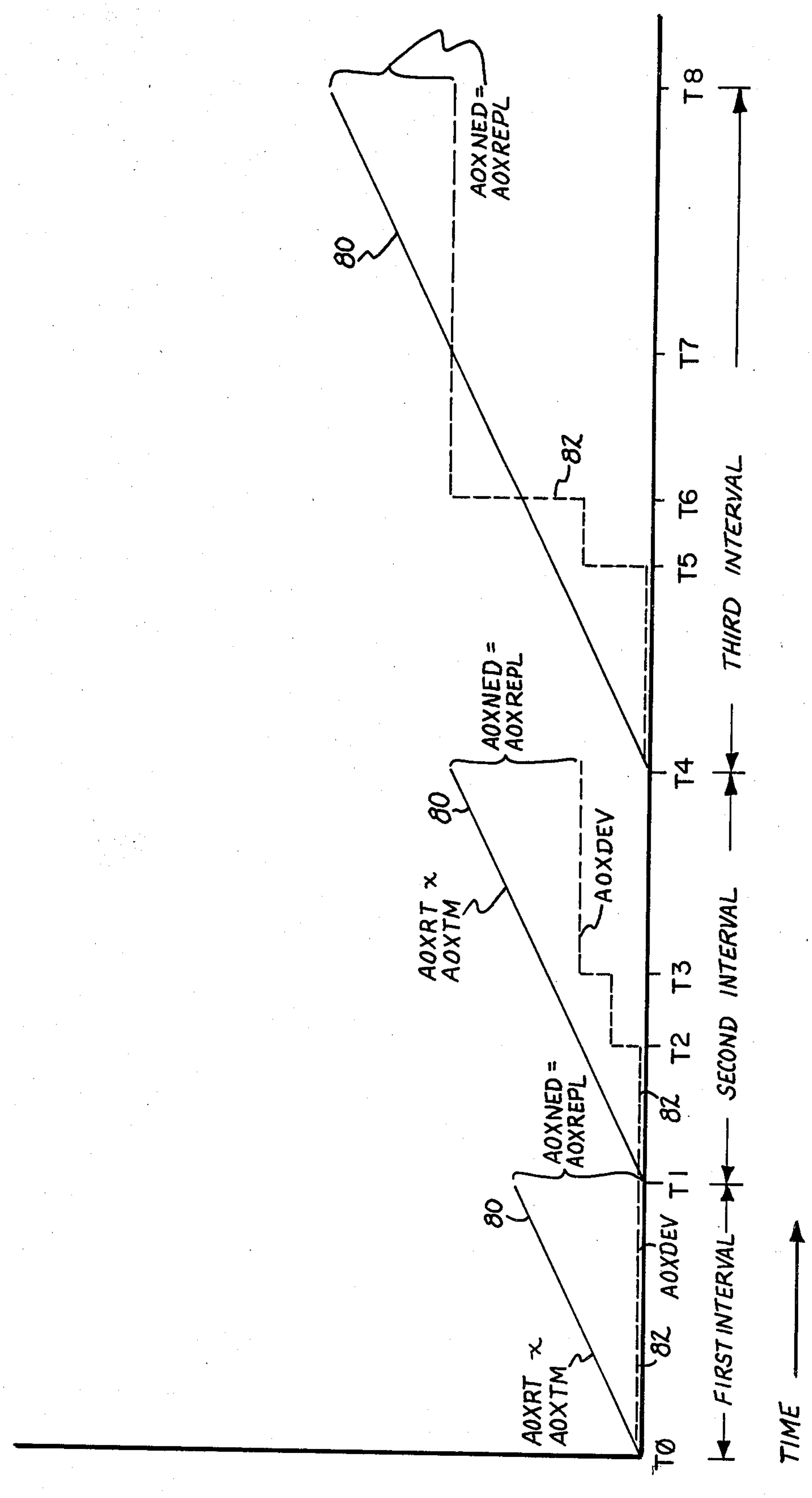
FIG. 2 is a graph illustrating operation of the system of the present invention.

FIG. 2 is a graphic representation of the interaction of the need for anti-oxidation replenishment due to time and the anti-oxidation replenishment provided by exhaustion replenishment, and illustrates the operation of the control system of the present invention. The horizontal axis represents passage of time.

For simplicity of description, and because it preferably is not large enough to be a major factor in the system, AOXCARRY is not represented in the drawing. AOXCARRY would, in effect, vary the initialization of the amount of anti-oxidation needed due to time.

Slanted solid curve 80 represents the need for anti-oxidation replenishment due to time, which is determined by multiplying the rate (AOXRT) times the expired time since the last replenishment (AXOTM). Dashed curve 82 represents accumulated anti-oxidation replenishment provided as part of exhaustion replenishment (AOXDEV). The vertical distance between these two curves 80 and 82 at any point on the graph represents needed anti-oxidation replenishment (AOXNED). As shown in Table 1, when AOXNED equals or exceeds AOXREPL, the amount of anti-oxidation replenishment equal to AOXREPL is added to the system.

In the example shown in FIG. 2, a first time interval is initiated at time $T_0$. Between times $T_0$ and $T_1$, no exhaustion replenishment is provided, and therefore curve 82 remains flat. The need for anti-oxidation replenishment (AOXNED) constantly increases until it reaches, at time $T_1$, a value equal to AOXREPL. At $T_1$, microcomputer 20 causes an amount of replenisher equal to AOXREPL to be supplied to developer tank 10. At this point, AOXTM and AOXDEV are reset to zero.

A second time interval is initiated at $T_1$. Once again, needed anti-oxidation replenishment due to time accumulates at a steady rate as shown by the slanted curve 80. In this time interval, some anti-oxidation replenishment is provided by exhaustion replenishment. AOXDEV shows an addition of exhaustion replenishment at time $T_2$ and again at time $T_3$. These additions delay the point at which anti-oxidation replenisher is added, because they keep the difference between the two curves (AOXNED) from equaling AOXREPL. At time $T_4$, the difference (AOXNED) between the two lines finally reaches or exceeds AOXREPL an amount of anti-oxidation replenisher equal to AOXREPL is added. AOXTM and AOXDEV are reinitialized to zero.

During a third time interval, starting at $T_4$, the need for anti-oxidation replenishment due to time continues on the same rate. Exhaustion replenishment is added at times $T_5$ and $T_6$. The replenishment at time $T_6$ brings the dashed curve 82 above curve 80, crossing at time $T_6$. From time $T_6$ until time $T_7$, when the curves again intersect, the system is slightly overreplenished. That is, the value representing the difference between the curves (AOXNED) is negative. No further exhaustion replenisher is added and, at time $T_8$, the difference (AOXNED) between the two curves equals or exceeds AOXREPL. An amount of anti-oxidation replenisher equal in AOXREPL is added at time $T_8$.

Figure 3:
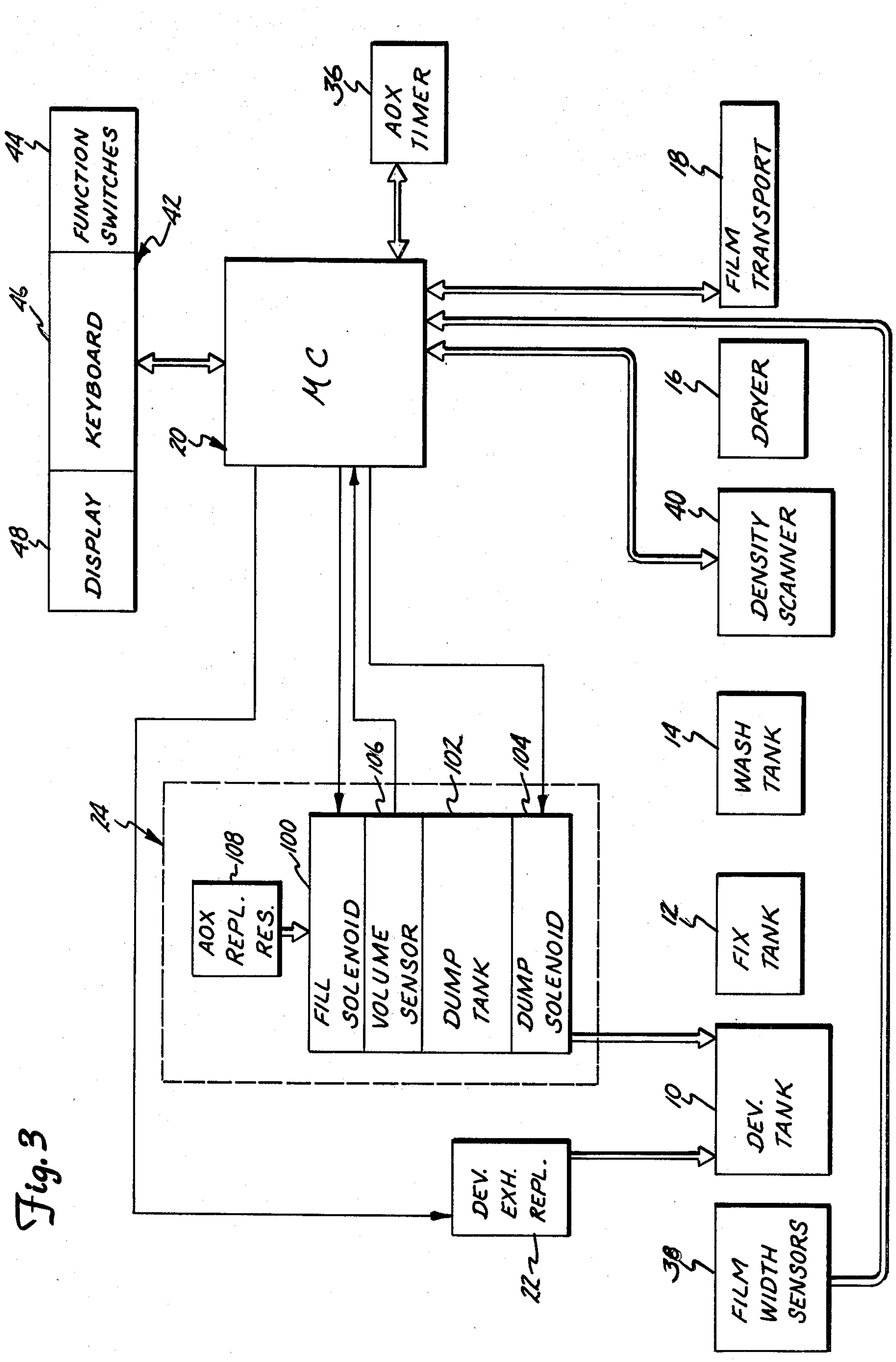
FIG. 3 is a block diagram of an alternate preferred embodiment, which employs a fill/dump apparatus to deliver a fixed amount of anti-oxidation replenishment fluid.

Another embodiment of the present invention for providing the fixed quantity of anti-oxidation replenishment at variable time intervals is shown in FIG. 3. The embodiment shown in FIG. 3 is generally similar to the embodiment shown in FIG. 1, and similar reference characters are used to designate similar elements. Here, anti-oxidation replenisher 24 includes fill solenoid 100, dump tank 102, dump solenoid 104, volume sensor 106 and anti-oxidation replenisher reservoir 108. Dump tank 102 holds a fixed quantity of anti-oxidation replenisher fluid (AOXREPL). In this "fill-and-dump" embodiment, anti-oxidation replenisher reservoir 108 must be above dump tank 102 and, in turn, dump tank 102 must be above developer tank 10 so that gravity feed of the anti-oxidation replenisher fluid is achieved. When it is time to provide anti-oxidation replenisher to developer tank 10, microcomputer 20 activates dump solenoid 104, so that the contents of dump tank 102 flow down into developer tank 10. When dump tank 102 is empty, microcomputer 20 deactivates dump solenoid 104 and then activates fill solenoid 106 which allows a fixed quantity of anti-oxidation replenisher to gravity fill from the reservoir 108 into dump tank 102.

In one preferred embodiment, the dump tank 102 is adapted to hold a volume equal to 1/64th of the minimum daily requirement of anti-oxidation replenishment fluid. The volume sensor means 106 determines when the dump tank 102 contains the predetermined amount of replenisher fluid. This sensor means 106 is, for example, a float valve which senses the fluid level and causes deactivation of the fill solenoid 100 when the predetermined amount of fluid is present. Dump tank 102 is then ready for activation of dump solenoid 104 by microcomputer 20.

The embodiment of FIG. 3, using dump tank 102, is preferred in processors where anti-oxidation replenisher reservoir 108 is above the developer tank, so that gravity feed is possible. The embodiment of FIG. 3 offers cost advantages since a pump is not needed.

Table 2 describes the process followed by microcomputer 20 in the embodiment shown in FIG. 3. The labels have the same definitions as in Table 1.

TABLE 2

| | |
|---|---|
| 2.1 | AOXNED = (AOXRT × AOXTM) − AOXDEV + AOXCARRY |
| 2.2 | If AOXNED is less than AOXREPL<br>(a) Reset AOXCARRY<br>(b) Go to 2.1<br>Else |
| 2.3 | AOXCARRY = AOXNED − AOXREPL |
| 2.4 | Reset AOXDEV |
| 2.5 | Reset AOXTM |
| 2.6 | Activate dump solenoid 104 |
| 2.7 | When dump tank 102 is empty, deactivate dump solenoid 104 |
| 2.8 | Activate fill solenoid 100 |
| 2.9 | Go To 2.1 |

In conclusion, the variable time, fixed quantity anti-oxidation replenishment control system of the present invention provides the flexibility for use in a wide range of processors. In those processors using replenishment pumps, it does not require precision pumps or exact controls on pump pressure or flow at the pump head, since a fixed quantity of anti-oxidation replenishment fluid is always delivered. In addition, the present invention is equally applicable to fill-and-dump type systems.

Although the present invention has been described with reference to preferred embodiments, workers skilled in the art will recognize that changes may be made in form and detail without departing from the spirit and scope of the invention.

What is claimed is:

1. A method of providing replenishment to processor fluid in a processor photosensitive material, the method comprising:
(a) initiating a time interval;
(b) providing exhaustion replenishment during the time interval as a function of use of processor fluid;
(c) providing a first replenishment signal indicative of an accumulated amount of anti-oxidation replenishment supplied as a result of the exhaustion replenishment during the time interval;
(d) periodically providing a second replenishment signal indicative of an amount of anti-oxidation replenishment required since the initiation of the interval as a function of time since initiation of the time interval and a stored anti-oxidation replenishment rate;
(e) periodically comparing the first and second replenishment signals;
(f) providing a predetermined amount of anti-oxidation replenishment if the second signal exceeds the first signal by a difference which is equal to or greater than a preset value; and
(g) initiating another time interval in which steps (b)–(g) are repeated.

2. The method of claim 1 further comprising the steps of:
determining a minimum time in the interval during which the difference cannot equal or exceed the preset value; and
inhibiting steps (d) and (e) during the minimum time.

3. The method of claim 1 wherein the first and second replenishment signals are first and second digital signals, respectively, and wherein the preset value is a digital value.

4. A control system for controlling anti-oxidation replenisher means to provide anti-oxidation replenishment to a processor of photosensitive material, the control system comprising:
means for measuring a time interval;
means for storing an anti-oxidation replenishment rate;
means for storing an exhaustion replenishment rate;
means for automatically providing exhaustion replenishment as a function of the use of processor fluid and the exhaustion replenishment rate;
means for providing a first replenishment signal indicative of an accumulated amount of anti-oxidation replenishment supplied as a result of the exhaustion replenishment during the time interval;
means for providing a second replenishment signal indicative of the amount of anti-oxidation replenishment required during the time interval as a function of expired time and the anti-oxidation replenishment rate;
means for periodically comparing the first replenishment signal and the second replenishment signal;
means for providing a predetermined amount of anti-oxidation replenishment when the second replenishment signal exceeds the first replenishment signal by a difference which is equal to or greater than a preset value.

5. The apparatus of claim 4, wherein:
the first and second replenishment signals are digital signals;
the anti-oxidation replenishment rate and exhaustion replenishment rate are stored as digital data; and
the means for comparing the first and second replenishment signals is a programmed digital computer.

6. The apparatus of claim 4, further comprising:
means for determining a minimum time in the interval during which the difference cannot equal or exceed the preset value; and
means for inhibiting the comparing of the first and second signals during the minimum time.

7. A computer-based control system for controlling anti-oxidation replenisher means for providing anti-oxidation replenishment to a processor of photosensitive material, the control system comprising:
clock means for measuring a time interval and providing a signal indicative of expired time of the interval;
exhaustion replenishment means responsive to a first replenishment signal for providing exhaustion replenishment;
means for providing a signal indicative of use of processor fluid;
anti-oxidation replenishment means responsive to a second replenishment signal for providing a predetermined amount of anti-oxidation replenishment; and
programmed digital computer means for: storing a digital value representing an exhaustion replenishment rate; receiving the signal indicative of use of processor fluid; storing a digital value representing an anti-oxidation replenishment rate; providing the first replenishment signal to the exhaustion replenishment means as a function of the use of processor fluid and the digital value representing the exhaustion replenishment rate; providing a first digital replenishment value indicative of an accumulated amount of anti-oxidation replenishment provided by exhaustion replenishment during the time interval; providing a second digital replenishment value indicative of the anti-oxidation replenishment needed as a function of the stored digital value representing the anti-oxidation replenishment rate and the signal indicative of expired time of the interval; comparing the first digital replenishment value with the second digital replenishment value periodically; providing the second replenishment signal to the anti-oxidation replenishment means when the difference by which the second digital replenishment value exceeds the first replenishment value is equal to or greater than a preset digital value; and
resetting the clock means to reinitiate the time interval when anti-oxidation has been provided by the anti-oxidation replenishment means in response to the second replenishment signal.

* * * * *